UNITED STATES PATENT OFFICE 2,413,161

SURFACE ACTIVE AGENTS

Ernst Zerner, New York, and William Kaplan, Brooklyn, N. Y., assignors, by mesne assignments, to Sun Chemical Corporation, New York, N. Y., a corporation of Delaware No Drawing. Application June 22, 1944,
Serial No. 541,664

1 Claim. (Cl. 260—505)

This invention relates to improvements in methods of producing alkyl-aromatic sulfonates useful as surface active agents and for detergent, wetting and similar purposes. It relates more particularly to improvements in methods of producing higher alkyl-aromatic sulfonates from non-aromatic hydrocarbon mixtures by condensation with aromatic compounds with the aid of aluminium chloride as a condensation catalyst, followed by sulfonation of the condensation product.

It is a well known fact that nuclearly sulfonated alkyl-aromatic compounds are valuable detergents, either as such or in the form of their alkali salts. Due to their excellent qualities and their comparatively low cost, they are dominating the market.

One known method of preparing said sulfonated alkyl-aromatic compounds consists in chlorinating refined Pennsylvanian kerosene, condensing the chlorinated product with benzene, toluene, or xylene in the presence of aluminium chloride and sulfonating the reaction product thereafter. Although the chemical character of the final product is known in general, it represents a mixture of numerous compounds differing according to the raw material used and the working and refining methods applied.

The chlorination needs a very expensive equipment. Furthermore, mono, di, and poly-chlorinated compounds are simultaneously formed and have to be separated at some stage of manufacturing by certain purifying methods.

It is one object of this invention to eliminate the step of chlorination. This is performed according to this invention by working with unsaturated instead of saturated hydrocarbons as a raw material for the Friedel-Crafts condensation. This enables us to use a raw material which is otherwise of very little value.

The condensation of unsaturated aliphatic hydrocarbons with aromatic hydrocarbons like benzene, toluene, xylene, by a Friedel-Crafts reaction is well known. The use of this reaction for manufacturing detergents by sulfonating the alkyl-aromatic condensation products is equally known and disclosed in several patents. According to one of the known processes, e. g. olefins are used as starting material, obtained by polymerization of gaseous olefins as formed in cracking of mineral oils for the condensation. According to another process the unsaturated part of a cracked kerosene is extracted e. g. with liquid sulfur dioxide and is used as a starting material.

Now, we have found the surprising fact that it is unnecessary to separate the unsaturated part out of a cracked mineral oil before condensation even when only 10–35 per cent unsaturated hydrocarbons are present. The condensation of the unsaturated material with an aromatic hydrocarbon as benzene, toluene, xylene still takes place with a reasonable yield. After condensation, first the excess of the aromatic hydrocarbon and then the higher boiling saturated hydrocarbon is distilled off; the latter being deodorized and water-clear and thus presenting a product of increased value.

Another object of this invention is to increase the yield of the process. This can be performed according to this invention by using gaseous hydrogen chloride as an additional catalytic agent. It is probable that some part of the hydrogen chloride adds to the double bond and is split off again in condensation so that a new addition to another part of so far unaffected unsaturated hydrocarbon may take place. Without using hydrogen chloride, a substantial part of the unsaturated hydrocarbon does not condense, it rather undergoes some other reaction leading to formation of tar.

Another advantage of promoting the condensing effect of aluminium chloride as described, is the fact that fewer undesirable by-products are formed. While the yield of the condensation product without the addition of hydrogen chloride amounts to about 30 per cent of the theoretical value (based on content of unsaturated hydrocarbon), it is raised to about 45 per cent when hydrogen chloride is bubbled through the reaction mixture, in the first five minutes.

We have found that bromine and hydrogen-bromide are still more effective, apparently because the addition of these materials to the double bond proceeds much faster than the addition of hydrogen chloride. This method of operation raises the yield to about 60 per cent of the theoretical value.

The main object of this invention is to use cracked mineral oil containing only 35 per cent or less unsaturated hydrocarbon as a raw material for a Friedel-Crafts reaction with benzene, toluene or xylene and to sulfonate the so-obtained condensation product after removing the excess of aromatic and the unattacked saturated hydrocarbon by distillation.

Other objects of the invention will be obvious and will appear hereinafter.

The cracked mineral oils which we employ must not be too low in boiling point and molecular weight. It is common knowledge that any surface active product has to contain a hydrophilic and a hydrophobic part and there has to be a certain balance between these constituents. Therefore, only such sulfonated alkyl aromatic compounds are appreciable detergents in which the side chain which represents particularly the hydrophobic part has a certain minimum length. On the other hand, this side chain can not be too long because the hydrophobic properties of the sulfonated products would be too high and, therefore, their calcium and magnesium salts would not be soluble enough. In other words, if the side chain is too long, the detergent would not be fast enough to hard water. It has been our experience that the boiling range of our unsaturated hydrocarbon serving as a raw material should be about 150 to 300° C. under atmospheric pressure. Expressed in length of the molecule, they should contain between 8 and 16 carbon atoms.

Most of the sulfonated alkyl aromatic detergents on the market are manufactured by using Pennsylvanian petroleum as a starting material, or other petroleum which, by refining, has been made similar to Pennsylvanian petroleum. Without insisting on some exact chemical constitution of our compounds, we would like to emphasize that we are not forced to work with just Pennsylvanian mineral oil which primarily contains open chain hydrocarbons. As shown in the examples given below, for our purposes mineral oil fractions from Texas containing a considerable part of naphthenic hydrocarbons are suitable without any previous refining.

The invention will be illustrated by the following specific examples. It will be realized by those skilled in the art that the invention is not limited thereto except as indicated in the appended patent claim. The parts are by weight, the temperatures are in degrees centigrade.

*Example I*

400 parts of a kerosene fraction, containing approximately 25 per cent of unsaturated hydrocarbon, boiling from 160 to 240°, obtained by the cracking of a Texas oil, is added with agitation to 400 parts of benzene and 20 parts aluminium chloride over a period of 20 minutes. The mixture is vigorously stirred at 55° for three hours. After 12 hours, the clear upper layer is decanted from the tarry residue and stirred for 10 minutes with one part water and four parts Filtrol. After filtration, the liquid is distilled until a boiling point of 240° is reached. The residue is sulfonated with an equal volume of 100 per cent sulfuric acid for one hour at 55°. The sulfonation mixture is stirred for a few minutes with 5 parts of water. After standing for twelve hours, the sulfonation mixture separates into three layers: A lower layer of spent acid, a middle layer of 40 parts of alkyl-benzene sulfonate, and an upper layer of hydrocarbon. The alkyl-benzene sulfonate has an acid number of about 400 indicating that about 20 per cent of free sulfuric acid is present. The alkyl-benzene sulfonate is treated with a small quantity of water and enough sodium bicarbonate to give a paste which, when dried, contains about 40 per cent of active material. The paste is then dried and ground. A powder possessing excellent detergent properties is obtained.

Similar results are obtained by working with toluene or xylene instead of benzene.

*Example II*

The same procedure as described in Example I is performed again, except that dry hydrogen chloride is bubbled through the condensation mixture for the first five minutes. The condensation is then continued for only two hours and the reaction mixture is worked up as described before. A yield of 60 parts of alkyl-benzene sulfonate is obtained.

*Example III*

The same procedure as described in Example I is performed again, except that 2 parts of dry bromine are added to the kerosene and the reaction is stopped after two hours. A yield of 80 parts of alkyl-benzene sulfonate is obtained.

*Example IV*

The same procedure as described in Example II is performed again except that hydrogen bromide is substituted for hydrogen chloride. A yield of 75 parts of alkyl-benzene sulfonate is obtained.

We claim:

In the process of manufacturing sulfonated alkylated monocyclic aromatic hydrocarbons by condensation of unsaturated aliphatic hydrocarbons with benzene and its homologues under the influence of aluminum chloride by means of a Friedel-Crafts synthesis and by sulfonating the condensation product, the step which comprises condensing cracked mineral oil fractions boiling under normal pressure between 150–300° C., and containing not more than 10–35 per cent. of unsaturated hydrocarbons with monocyclic hydrocarbons of the class consisting of benzene, toluene, and xylene, in the presence of aluminum chloride.

ERNST ZERNER.
WILLIAM KAPLAN.